T. J. MADIGAN.
VALVE.
APPLICATION FILED MAR. 29, 1919.
1,322,035.
Patented Nov. 18, 1919.
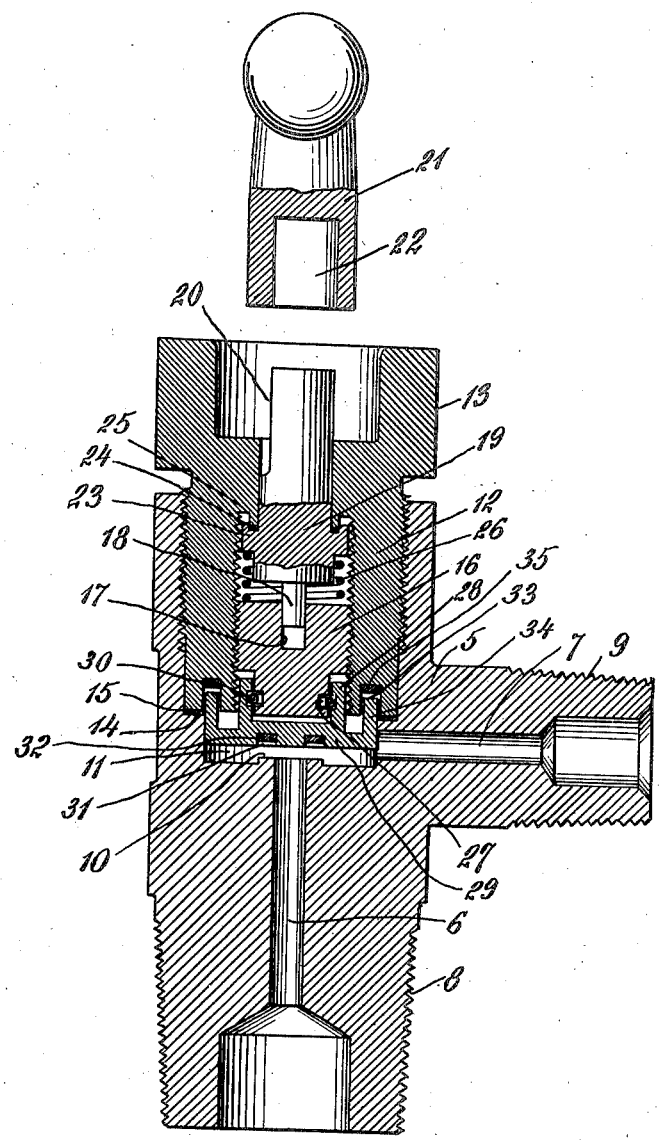
INVENTOR
Thomas J Madigan
BY
Pennie Davis Marvin & Edmonds
his ATTORNEYS

UNITED STATES PATENT OFFICE.

THOMAS J. MADIGAN, OF NEW YORK, N. Y., ASSIGNOR TO MADIGAN UNION CORPORATION, OF WILMINGTON, DELAWARE, A CORPORATION OF DELAWARE.

VALVE.

1,322,035.     Specification of Letters Patent.     Patented Nov. 18, 1919.

Application filed March 29, 1919. Serial No. 286,098.

*To all whom it may concern:*

Be it known that I, THOMAS J. MADIGAN, a citizen of the United States, residing at New York, in the county of New York, State of New York, have invented certain new and useful Improvements in Valves; and I do hereby declare the following to be a full, clear, and exact description of the invention, such as will enable others skilled in the art to which it appertains to make and use the same.

This invention relates to valves particularly intended and adapted for use in connection with cylinders or "bottles" employed for storing gases under pressure such, for example, as acetylene.

Among the objects of the invention is the provision of a valve of simple and relatively inexpensive construction which may be readily assembled and which in use insures against escape of the gas controlled thereby.

A further object of the invention is the provision of a valve having a member coöperating with a seat therein, supported in a manner insuring engagement with said seat when moved to closed position and readily adjustable to closed or open position.

Further objects and advantages of the invention will be apparent as it is better understood by reference to the following specification when read in connection with the accompanying drawing illustrating the valve in longitudinal section.

Cylinders or "bottles" in which gases are stored under pressure are provided with an outlet valve which should effectively close the outlet from the cylinder, and prevent escape of the gas other than through the outlet when the valve is open. The pressures employed in storing such gases are relatively high and difficulty is experienced in providing a valve which is simple in construction and insures against leakage of the gas. The use of the usual gasket materials employed in valves for other purposes is precluded owing to the character of the gases and the rapid deterioration of such materials and the problem of providing a suitable valve for the uses referred to has led to many suggestions, but has not heretofore resulted in the provision of a thoroughly satisfactory valve.

I have devised a valve which meets the requisite conditions, being constructed of inexpensive material in a manner which insures production at relatively slight expense and which may be depended upon to safely retain the gases at the pressures employed without leakage or other loss. Referring to the drawing, 5 indicates the body of the valve having an inlet passage 6 and an outlet passage 7. The body 5 is threaded at 8 in the usual manner for connection with the cylinder or "bottle" and at 9 for connection with a pipe or other means of conveying the gas to the apparatus wherein it is utilized.

The passage 6 terminates in a raised seat 10 at the bottom of a chamber 11. The chamber 11 is closed by a sleeve 12 threadedly engaging the body 5 and having at its upper end a knurled or octagonal head 13 whereby it is adjusted in the body 5. A shoulder 14 is provided near the bottom of the chamber 11 and the end of the sleeve 12 coöperates therewith, a washer 15, preferably of wrought iron, being disposed between the coöperating parts to insure a gas tight joint which prevents the escape of gas between the sleeve and the body.

A valve support 16 is threadedly mounted within the sleeve 12 and is provided with a slot 17 to receive a key 18 on the lower end of the stem 19 which projects upwardly through the head 13. The stem 19 may be circular in cross section and is preferably flattened at 20 to receive a T-head or other form of wrench 21 having an opening 22 conforming to the end of the stem 19. A groove 23 in the stem 19 is adapted to receive a washer 24 of aluminum or other suitable material and a lip 25 on the sleeve 24 is arranged to engage the washer which is held in engagement therewith by a spring 26 disposed between the valve support 16 and the stem 19. Thus while the stem is freely rotatable, the gas which may escape past the valve support 16 is prevented from escaping to the atmosphere.

Near its lower end the valve support 16 is provided with an annular groove 27 and a flange 28 on a valve member 29 is provided with a coöperating groove. A spring ring 30 is disposed in the groove 29 and when the flange 28 has been slipped over the end of the valve support 16 the ring expands thus holding the valve member in articulated relation with the valve support 16 but permitting sufficient movement thereof to insure proper coöperation with the seat 10 should the coöperating faces of the valve member 29 or the seat 10, through wear or imperfections, fail to register. Preferably the face of the valve member 29 is provided with an annular groove 31 in which a washer 32 of aluminum or other suitable material is disposed thus providing a relatively soft surface for engagement with the seat 10, the surface being, however, supported against distortion by the walls of the groove. An annular channel 33 is formed in the lower end of the sleeve 12 to receive a flange 34 on the valve member 29 and a washer 35 of aluminum or other suitable material is seated in the bottom of the channel for engagement by the end of the flange 34 when the valve member is lifted from the seat. When so engaged, a gas tight joint is formed between the valve member and the sleeve 12 effectually preventing escape of gas about the valve member.

From the foregoing description it will be apparent that I have perfected a valve, the details of construction of which is extremely simple, but which provides for secure sealing at every point of possible escape for the gases. When the valve member is closed, the washer 32, being in engagement with the seat 10, the gas is securely held within its container regardless of the pressure employed. Sufficient play is permitted the valve member 29 by articulation with the valve support 16 to insure a proper engagement of the valve member and seat even after the valve has been in service for extended periods. When the valve member is lifted from the seat by rotating the stem 19, the flange 34 engages the washer 35 and the gas is thus permitted to escape only through the outlet 7. Whether the valve is closed or open, no gas can pass the washer 15 and escape between the body of the valve and the sleeve 12. The washer 24 securely seals the valve while the valve member 29 is being actuated from open to closed position. All of the parts with the exception of the washers may be constructed of relatively cheap and easily workable material such as steel or iron, although other and more expensive materials may be obviously employed. I prefer the use of aluminum in sealing the various joints, this material being readily available and well adapted to the purpose. Other materials may be substituted, however, having in mind the character of the gases with which the valve is to be used as well as the purpose for which the washers are employed.

Various changes may be made in the form, arrangement and construction of the parts without departing from the spirit of the invention or sacrificing any of its material advantages.

I claim:

1. In a valve for controlling fluids under pressure, the combination with a body having an inlet terminating in a seat, a chamber surrounding said seat and an outlet from said chamber, of a sleeve supported in said body, a valve support threadedly mounted in said sleeve, a valve member on said valve support and adapted for engagement with said seat, means for actuating said valve support to move said valve member toward and from said seat, a spring between said actuating means and valve support, coöperating means on said actuating means and sleeve to prevent the escape of gas therebetween, and coöperating means on said valve member and sleeve to prevent escape of gas about said valve member when the latter is lifted from said seat.

2. In a valve for controlling fluids under pressure, the combination with a body having an inlet terminating in a seat, a chamber surrounding said seat and an outlet from said chamber, of a sleeve supported in said body, a valve support threadedly mounted in said sleeve, a valve member articulated with said valve support and adapted for engagement with said seat, means for actuating said valve support to move said valve member toward and from said seat, a spring between said actuating means and valve support, coöperating means on said actuating means and sleeve to prevent the escape of gas therebetween, and coöperating means on said valve member and sleeve to prevent escape of gas about said valve member when the latter is lifted from said seat.

3. In a valve for controlling fluids under pressure, the combination with a body having an inlet terminating in a raised seat, a chamber surrounding said seat and an outlet from said chamber, of a sleeve supported in said body, a valve support threadedly mounted in said sleeve, a valve member articulated with said valve support and having a recess in its face, a relatively soft facing in said recess adapted to register with said seat, means for actuating said valve support to move said valve member toward and from said seat, a spring between said actuating means and valve support, coöperating means on said actuating means and sleeve to prevent the escape of gas therebetween, and coöperating means on said valve member and sleeve to prevent escape of gas about said valve member when the latter is lifted from said seat.

4. In a valve for controlling fluids under pressure, the combination with a body having an inlet terminating in a seat, a chamber surrounding said seat and an outlet from said chamber, of a sleeve supported in said body and carrying a valve support and a valve adapted to coöperate with said seat, a stem for actuating said valve support having a loose connection therewith, a coöperating lip and channel on said sleeve and stem to prevent escape of gases therebetween and a spring for maintaining said lip and channel in operative relation.

5. In a valve for controlling fluids under pressure, the combination with a body having an inlet terminating in a seat, a chamber surrounding said seat and an outlet from said chamber, of a sleeve supported in said body and carrying a valve support and a valve adapted to coöperate with said seat, a stem loosely connected to and adapted to actuate said valve support, a lip on said sleeve, a channel in said stem, a washer in said channel and a spring between said valve support and stem whereby said washer is held in close engagement with said lip.

In testimony whereof I affix my signature.

THOMAS J. MADIGAN.